US012085038B2

(12) United States Patent
Mita et al.

(10) Patent No.: US 12,085,038 B2
(45) Date of Patent: Sep. 10, 2024

(54) INTERNAL COMBUSTION ENGINE

(71) Applicant: ISUZU MOTORS LIMITED, Yokohama (JP)

(72) Inventors: Takuro Mita, Fujisawa (JP); Yorimasa Tsubota, Fujisawa (JP); Masanori Nakamura, Fujisawa (JP); Takafumi Kishigami, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/503,376

(22) Filed: Nov. 7, 2023

(65) Prior Publication Data

US 2024/0159200 A1 May 16, 2024

(30) Foreign Application Priority Data

Nov. 15, 2022 (JP) ................................ 2022-182601

(51) Int. Cl.
*F02F 3/10* (2006.01)

(52) U.S. Cl.
CPC ...................................... *F02F 3/10* (2013.01)

(58) Field of Classification Search
CPC ......................................................... F02F 3/10
See application file for complete search history.

(56) References Cited

U.S. PATENT DOCUMENTS

2006/0117947 A1* 6/2006 Tabata .................... F02F 3/105 92/223
2011/0139114 A1* 6/2011 Nakazawa ................ F16J 1/04 123/193.6

FOREIGN PATENT DOCUMENTS

JP 2005-090442 A 4/2005
JP 2007-002989 A 1/2007
JP 2010-236443 A 10/2010
JP 2019-120185 A 7/2019

* cited by examiner

*Primary Examiner* — Kevin A Lathers
(74) *Attorney, Agent, or Firm* — Shih IP Law Group, PLLC

(57) ABSTRACT

An internal combustion engine includes: a cylinder including a thrust region and an anti-thrust region; and a plurality of concave portions formed in a belt-like central region including a central portion in the axial direction of the cylinder and extending along the circumferential direction on an inner wall surface. In the central region, the number of concave portions formed in a first partial region having a first predetermined width along the circumferential direction of the thrust region and the number of concave portions formed in a second partial region having a second predetermined width that is smaller than the first predetermined width along the circumferential direction of the anti-thrust region is smaller than the number of concave portions formed in other regions of the central region.

11 Claims, 9 Drawing Sheets

B-B LINE CROSS SECTION

INTERNAL COMBUSTION ENGINE

CROSS-REFERENCE TO RELATED APPLICATIONS

The present application claims priority to Japanese Patent Application number 2022-182601, filed on Nov. 15, 2022 contents of which are incorporated herein by reference in their entirety.

BACKGROUND OF THE INVENTION

The present disclosure relates to an internal combustion engine.

Reducing the sliding resistance (frictional force) of a piston ring due to piston reciprocation is effective for an internal combustion engine in which a piston slides over an inner wall surface of a cylinder. In order to reduce the frictional force, a technique of forming concave portions on the inner wall surface of the cylinder has been proposed (e.g., see Japanese Unexamined Patent Application Publication No. 2010-236443).

Pressure (surface pressure) acts on the inner wall surface of the cylinder due to the piston reciprocation, but if concave portions are provided on the inner wall surface, a contact area that is contacted by a skirt portion of the piston becomes small, which may increase the surface pressure acting on the inner wall surface from the skirt portion.

In addition, when there are a large number of regions where concave portions are formed, the amount of lubricating oil supplied to the inner wall surface is increased, which causes the lubricating oil adhered to the concave portions to move to a combustion chamber side by the piston, thereby consuming the lubricating oil.

BRIEF SUMMARY OF THE INVENTION

The present disclosure has been made in view of these points and its object is to reduce consumption of lubricating oil while preventing an increase in the surface pressure acting on an inner wall surface.

An aspect of the present disclosure provides an internal combustion engine including: a piston that includes a skirt portion and reciprocates between a top dead center and a bottom dead center; a cylinder in which the piston slides over an inner wall surface, the inner wall surface including a thrust region against which the skirt portion is pressed when the piston reciprocates, on the inner wall surface, and an anti-thrust region that is opposite to the thrust region on the inner wall surface; and a plurality of concave portions formed in a belt-like central region including a central portion in an axial direction of the cylinder and extending along a circumferential direction on the inner wall surface, wherein in the central region, the number of concave portions formed in a first partial region having a first predetermined width along the circumferential direction of the thrust region and the number of concave portions formed in a second partial region having a second predetermined width that is smaller than the first predetermined width along the circumferential direction of the anti-thrust region is smaller than number of concave portions formed in other regions in the central region.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of the Internal Combustion Engine>

Figure 1:
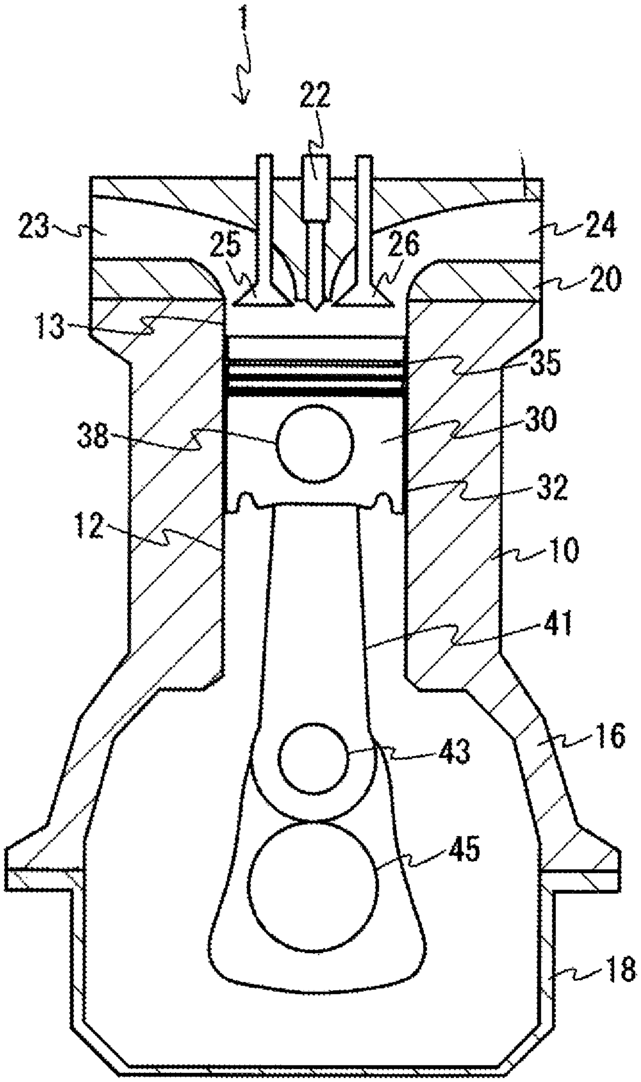
FIG. 1 is a schematic view showing a configuration of an internal combustion engine 1.

FIG. 1 is a schematic view showing a configuration of an internal combustion engine 1. The internal combustion engine 1 is a direct injection engine, for example. The internal combustion engine 1 includes a cylinder block 10, a cylinder head 20, and a piston 30.

The cylinder block 10 includes a cylinder 12 that houses a piston 30 in a manner allowing the piston 30 to reciprocate, and a crankcase 16 that houses a crankshaft 45. The cylinder block 10 has a configuration in which the cylinder 12 and the crankcase 16 are integrated. An oil pan 18 that reserves lubricating oil is attached to the crankcase.

A cylinder head 20 is provided to an upper portion of the cylinder block 10. The cylinder head 20 includes an injector 22, an intake port 23, an exhaust port 24, an intake valve 25, and an exhaust valve 26. The injector 22 injects fuel into a combustion chamber defined by a top surface of the piston 30, an inner wall surface 13 of the cylinder 12, and the cylinder head 20. The intake port 23 is an intake port for introducing fresh air into the combustion chamber. The exhaust port 24 is an exhaust port for discharging exhaust gas from the combustion chamber. The intake valve 25 opens and closes to introduce fresh air from the intake port 23 into the combustion chamber. The exhaust valve 26 opens and closes to guide the exhaust gas from the combustion chamber into the exhaust port 24.

When the piston 30 reciprocates between the top dead center and the bottom dead center, the piston 30 slides over the inner wall surface 13 of the cylinder 12. The lubricating oil is supplied to the inner wall surface 13 to form an oil film. A plurality of piston rings 35 are provided to an outer periphery of an upper portion of the piston 30 in order to seal in combustion gas and maintain the oil film at a predetermined thickness. A piston ring 35 is provided in each of a plurality of ring grooves 31*a*, 31*b*, and 31*c* (see FIG. 2) formed on an outer peripheral surface of the piston 30. A skirt portion 32 is provided to a lower portion of the piston 30. The skirt portion 32 is a portion of the piston 30 below the piston pin 38.

Figure 2:
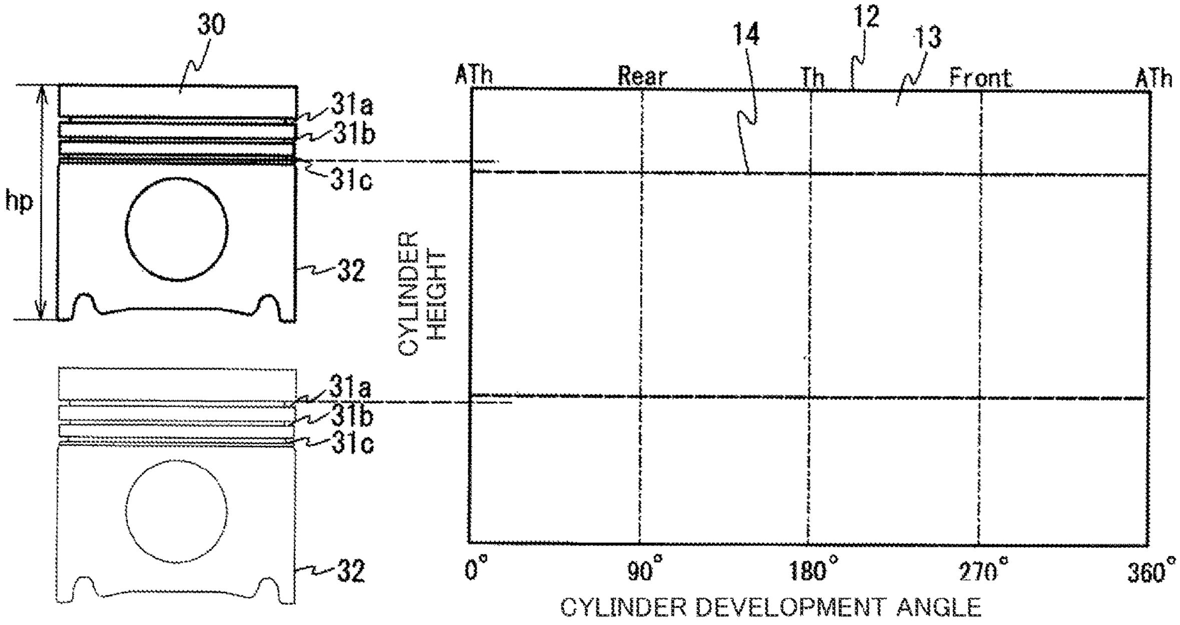
FIG. 2 is a schematic view showing the positions of the top dead center and the bottom dead center of a piston 30 relative to a cylinder 12.

FIG. 2 is a schematic view showing the positions of the top dead center and the bottom dead center of the piston 30 relative to the cylinder 12. In FIG. 2, the inner wall surface 13 of the cylinder 12 that has been rolled out in a plane, as a development view, is shown for convenience of explanation. The piston 30 shown in the upper left of FIG. 2 is positioned at the top dead center, and the piston 30 shown in the lower left of FIG. 2 is positioned at the bottom dead center. The horizontal axis of the development view of the cylinder 12 represents development angles of the cylinder 12, and the vertical axis represents heights of the cylinder 12. A position with a development angle of 180° is a center position of a thrust region of the cylinder 12 in the circumferential direction, and a position with a development angle of 0° (360°) is a center position of an anti-thrust region of the cylinder 12 in the circumferential direction. In FIG. 2, a region defined by two broken lines in the height direction (axial direction) of the cylinder 12 is a central region 14 of the inner wall surface 13.

The central region 14 is a belt-like region including a central portion in the axial direction of the cylinder 12 and extending along the circumferential direction on the inner wall surface 13. Concave portions 52 (see FIGS. 5A and 5B) are formed at predetermined intervals on a portion of the central region 14. As shown in FIG. 2, the central region 14 is a region located below the ring groove 31*c* of the piston 30 positioned at the top dead center in the height direction and located above the ring groove 31*a* of the piston 30 positioned at the bottom dead center in the height direction. That is, the central region 14 is a region that the piston rings 35 of the ring grooves 31*a*, 31*b*, and 31*c* are not in contact with when the piston 30 stops at the top dead center or the bottom dead center. In other words, the central region 14 may be a region through which the ring grooves 31*a*, 31*b*, and 31*c* pass when the piston 30 reciprocates between the top dead center and the bottom dead center. In other words, the central region 14 is a region where the moving speed of the piston 30 is equal to or greater than a predetermined value when the piston 30 reciprocates between the top dead center and the bottom dead center.

The piston 30 is connected to a connecting rod 41 via a piston pin 38. The connecting rod 41 is connected to a crankshaft 45 via a crank pin 43. Due to this, the reciprocation of the piston 30 in the cylinder 12 is converted into the rotation of the connecting rod 41 to cause the crankshaft 45 to rotate.

In a configuration in which the piston 30 slides over the inner wall surface 13 of the cylinder 12, reducing the sliding resistance (frictional force) of the piston ring 35 at the time when the piston 30 reciprocates is effective for improving fuel efficiency or the like. Therefore, in order to appropriately reduce the frictional force, the concave portions 52 are formed on a predetermined region of the inner wall surface 13.

Pressure acts on the inner wall surface 13 of the cylinder 12 when the piston 30 reciprocates in conjunction with combustion in the internal combustion engine 1. Specifically, when the skirt portion 32 of the piston 30 is pressed against the inner wall surface 13, the pressure (surface pressure) acts on the inner wall surface 13.

Figure 3:
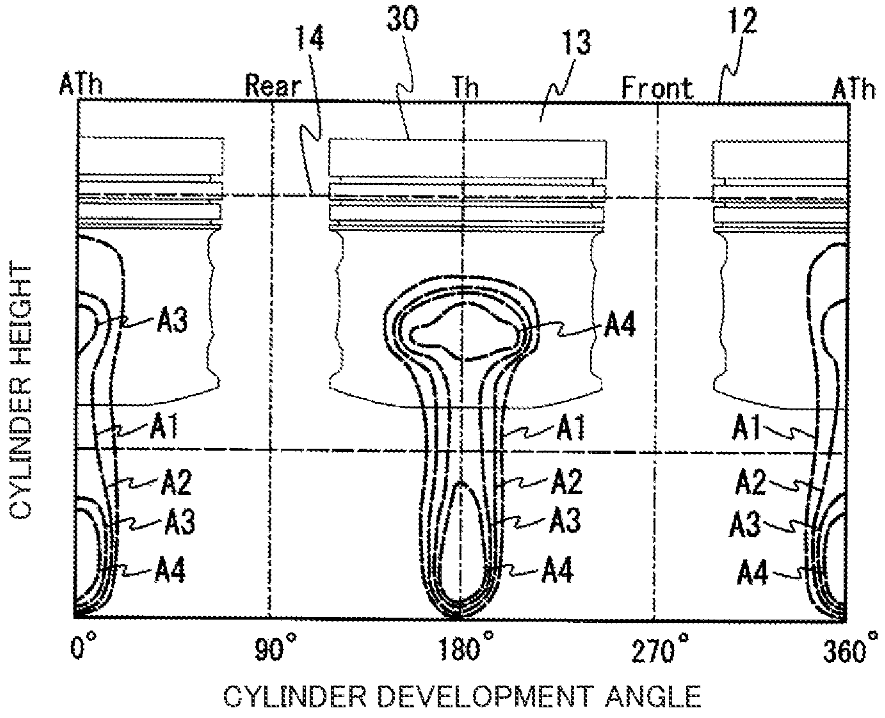
FIG. 3 is a schematic view for explaining the distribution of the pressure acting on the cylinder 12 when the piston 30 reciprocates.

FIG. 3 is a schematic view for explaining the distribution of the pressure acting on the cylinder 12 when the piston 30 reciprocates. Each of the broken lines A1, A2, A3, A4 represents positions with the same pressure. The pressures represented by the four broken lines A1 to A4 satisfy a relationship of "A4>A3>A2>A1". Therefore, it is understood that pressure increases at the portion of the cylinder 12 with a development angle of 180° and at the portion with a development angle of 0° (360°), which are shown in FIG. 3. Normally, when the piston 30 is at a position shown in FIG. 3 (a position slightly downward from the top dead center), the largest pressure acts on the inner wall surface 13. Further, "Th" means a thrust side where the pressure from the skirt portion 32 is largest, "ATh" means an anti-thrust side that is opposite to the thrust side, "Front" means a front side of the piston 30, and "Rear" means a rear side of the piston 30.

The inner wall surface 13 of the cylinder 12 includes the thrust region, against which the skirt portion 32 is pressed when the piston 30 reciprocates, on the inner wall surface 13, and the anti-thrust region that is opposite to the thrust region on the inner wall surface 13. The thrust region is a region within a predetermined angle range around the development angle of 180° (e.g., a range from 135° to 225°). The anti-thrust region is a region within a predetermined angle range around the development angle of 0° (360)° (e.g., ranges from 0° to 45° and from 315° to 360°).

If the concave portions 52 are provided to the entire central region 14, a contact area that the skirt portion 32 of the piston 30 comes into contact with becomes small, so that the surface pressure acting on the inner wall surface 13 from the skirt portion 32 may increase. Therefore, it is necessary to provide the concave portions 52 so as to prevent an increase in the surface pressure from the skirt portion 32.

Further, if the concave portions 52 are provided to the central region 14, the lubricating oil supplied to the inner wall surface 13 is deposited in the concave portions 52, but when the piston 30 moves to the top dead center side, the lubricating oil in the concave portions 52 is swept out by the piston ring 35, and moves to the combustion chamber to be vaporized, which may waste the lubricating oil. When the concave portions 52 are formed on the entire central region 14, the amount of lubricating oil moving from the concave portions 52 to the combustion chamber increases. For these reasons, it is necessary to provide the concave portions 52 so as to prevent the movement of the lubricating oil to the combustion chamber.

Due to this, in the present embodiment, the concave portions 52 are provided to a portion of the central region 14 in order to reduce the sliding resistance of the piston ring 35 and the surface pressure acting on the inner wall surface 13 from the skirt portion 32, and to prevent waste of the lubricating oil.

<Concave Portion Formation Position on the Inner Wall Surface>

A position where concave portions are formed on the inner wall surface 13 will be described by taking the first to fifth embodiments as examples.

First Embodiment

Figure 4:
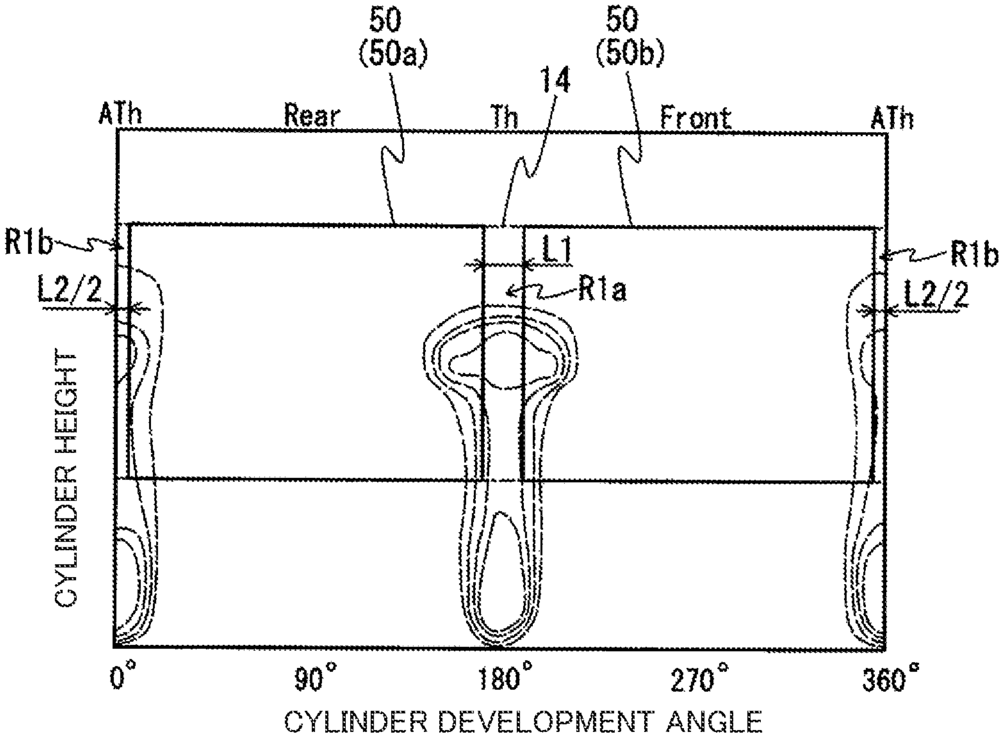
FIG. 4 is a schematic view for explaining a concave portion formation region 50 of the first embodiment.

FIG. 4 is a schematic view for explaining a concave portion formation region 50 of the first embodiment. A plurality of concave portions 52 are formed at predetermined intervals in the concave portion formation region 50, which is a portion of the central region 14. The concave portion formation region 50 is a region within the central region 14 excluding a first partial region R1*a* and a second partial region R1*b*. Therefore, the concave portions 52 are not formed in the entire central region 14, but in a partial region of the central region 14.

It should be noted that although concave portions 52 are not formed in the first partial region R1*a* and the second partial region R1*b* below, the embodiment is not limited thereto, and a small number of concave portions 52 may be formed in the first partial region R1*a* and the second partial region R1*b*. That is, the number of concave portions formed in the first partial region R1*a* and the second partial region R1*b* (e.g., density of the concave portions) is less than the number of concave portions formed in in the concave portion formation region 50.

The first partial region R1*a* includes at least a region of the center in the axial direction of the thrust region within the central region 14. The second partial region R1*b* also includes at least a region of the center in the axial direction of the anti-thrust region within the central region 14. In the first embodiment, the first partial region R1*a* and the second partial region R1*b* are regions extending across the entire region in the axial direction of the central region 14. In other words, the first partial region R1*a* and the second partial region R1*b* are regions extending from one end to the other end of the central region 14 in the axial direction of the central region 14. Therefore, the concave portion formation region 50 is divided into two formation regions 50*a*, 50*b* by the first partial region R1*a* and the second partial region R1*b*. Here, the formation region 50*a* has the same area as the formation region 50*b*.

The first partial region R1*a* is a region having a first predetermined width L1 along the circumferential direction of the thrust region. The second partial region R1*b* is a region having a second predetermined width L2 along the circumferential direction of the anti-thrust region. The second predetermined width L2 of the second partial region R1*b* is smaller than the first predetermined width L1 of the first partial region R1*a*. The first predetermined width L1 is larger than the second predetermined width L2 because a region where the pressure acting on the thrust region side is large is wider than a region where the pressure acting on the anti-thrust region side is large.

The first predetermined width L1 is desirably equal to or less than a width of the skirt portion 32 in the circumferential direction. Referring to FIG. 3, the surface pressure is large at a portion where the width is equal to or less than the width of the skirt portion 32 in the circumferential direction. Therefore, by causing the first predetermined width of the first partial region R1*a* to be equal to or less than the width of the skirt portion 32 in the circumferential direction, it is possible to effectively prevent an increase in the surface pressure caused by the skirt portion 32.

Figure 5A:
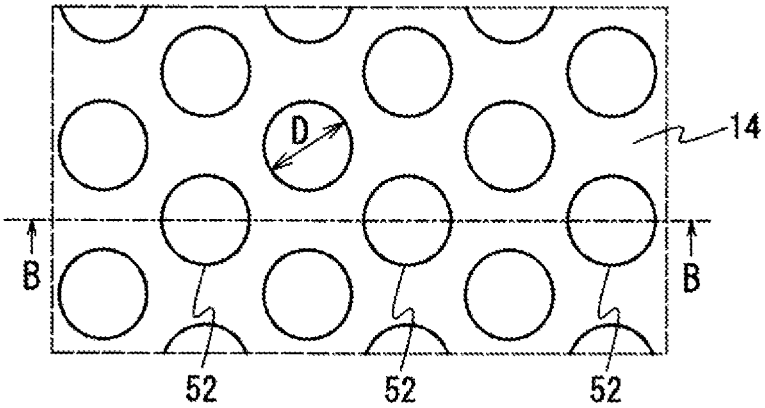
FIG. 5A is a schematic view for explaining the shape of a concave portion 52.
Figure 5B:
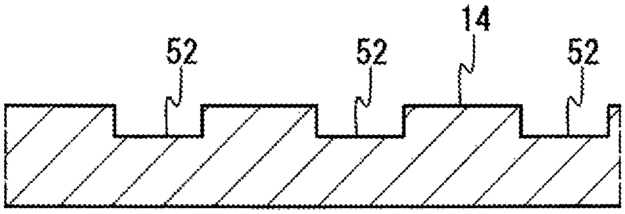
FIG. 5B is a schematic view for explaining the shape of a concave portion 52.

FIGS. 5A and 5B are each a schematic view for explaining the shape of the concave portion 52. FIG. 5A is an enlarged view of a portion of the concave portion formation region 50, and FIG. 5B is a cross-sectional view taken along the line B-B of FIG. 5A. The concave portions 52 are arranged at predetermined intervals on the inner wall surface 13. Here, the concave portion 52 is circular with a diameter D. The depth of the concave portion 52 is smaller than the diameter D. However, the embodiment is not limited thereto, and the concave portion 52 may be a rectangular concave portion, for example.

The concave portion formation region 50 (specifically, formation regions 50*a*, 50*b*) in the first embodiment is a region located below the ring groove 31*c* of the piston 30 that is positioned at the top dead center in the height direction and located above the ring groove 31*a* of the piston 30 that is positioned at the bottom dead center (see FIG. 2). In other words, the concave portion formation region 50 is a region that the piston ring 35 of the piston 30 positioned at the top dead center does not come into contact with, and is also a region that the piston ring 35 of the piston 30 positioned at the bottom dead center does not come into contact with. This makes it possible to prevent an increase in the frictional force caused by the piston ring 35 coming into contact with the concave portions 52 when the piston 30 stops at the top dead center or the bottom dead center.

Further, since the first partial region R1*a* and the second partial region R1*b* are provided such that they cover regions where the surface pressure from the skirt portion 32 of the piston 30 increases, it is possible to prevent the skirt portion 32 from coming into contact with the concave portion 52 at portions where the surface pressure increases. This makes it possible to prevent an increase in the surface pressure caused by the skirt portion 32 coming into contact with the concave portion 52. In particular, by causing the first predetermined width L1 of the first partial region R1*a* where the surface pressure from the skirt portion 32 increases to be larger than the second predetermined width L2 of the second partial region R1*b*, it is possible to effectively prevent an increase in the surface pressure caused by the skirt portion 32.

Further, providing the second partial region R1*b* in addition to the first partial region R1*a* narrows the concave portion formation region 50, making it possible to reduce the number of concave portions 52. This makes it possible to reduce the amount of lubricating oil moving from the concave portions 52 to the combustion chamber side, which prevents waste of the lubricating oil.

Second Embodiment

The second embodiment of a formation position of the concave portions 52 will be described while referencing FIG. 6. The area of a concave portion formation region 50 of the second embodiment is different from the area of the concave portion formation region 50 of the first embodiment. Here, the area of the concave portion formation region 50 of the second embodiment is smaller than the area of the concave portion formation region 50 of the first embodiment.

Figure 6:
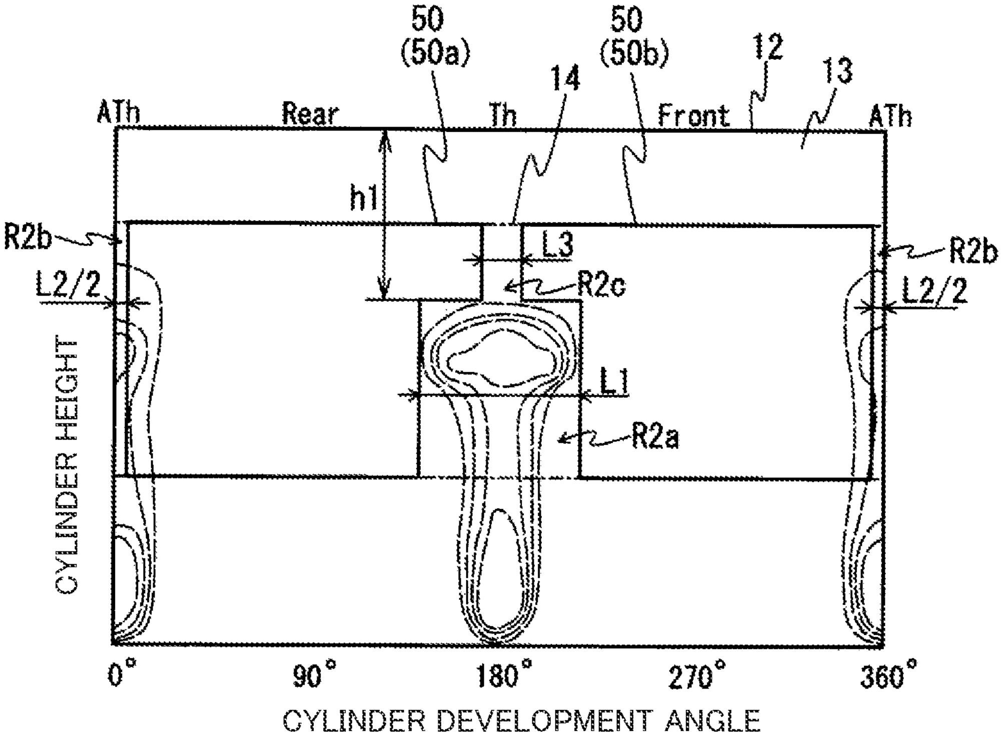
FIG. 6 is a schematic view for explaining a concave portion formation region 50 of the second embodiment.

FIG. 6 is a schematic view for explaining the concave portion formation region 50 of the second embodiment. The central region 14 of the inner wall surface 13 of the second embodiment includes a first partial region R2*a*, a second partial region R2*b*, and a third partial region R2*c*. A region of the central region 14 excluding the three partial regions R2*a* to R2*c* is the concave portion formation region 50 in which the concave portions 52 are formed. It should be noted that a small number of concave portions may be formed in the three partial regions R2*a* to R2*c*. In other words, in the three partial regions R2*a* to R2*c*, a small number of concave portions may be formed, with this number being smaller than the number of concave portions formed in the concave portion formation region 50.

The first partial region R2*a* of the second embodiment differs from the first partial region R1*a* of the first embodiment, which extends across the entire region in the axial direction of the central region 14, in that the first partial region R2*a* is a region extending from the center to the bottom dead center side in the axial direction of the central region 14. The first partial region R2*a* is a region of a portion where pressure acts on the inner wall surface 13 from the piston 30. Therefore, the concave portions 52 are not formed in the region where the pressure acts on the inner wall surface 13 from the piston 30. The first partial region R2*a* is quadrilateral (specifically, rectangular) here, but the embodiment is not limited thereto, and may be circular, for example.

The second partial region R2*b* of the second embodiment is the same region as the second partial region R1*b* of the first embodiment. The second partial region R2*b* is a region extending across the entire region in the axial direction of the central region 14. The second predetermined width L2 of the second partial region R2*b* is the same size as the second predetermined width L2 of the second partial region R1*b* of the first embodiment.

The third partial region R2*c* is a rectangular region located on the top dead center side of the central region 14. The third partial region R2*c* is connected to the first partial region R2*a* along the axial direction. A third predetermined width L3 along the circumferential direction of the third partial region R2*c* is smaller than the first predetermined width L1 of the first partial region R2*a*. The third predetermined width L3 of the third partial region R2*c* is the same as the first predetermined width L1 of the first partial region R1*a* of the first embodiment.

It should be noted that the position of a boundary between the first partial region R2*a* and the third partial region R2*c* is a position apart from an upper end of the cylinder 12 by a distance h1 in the axial direction. The distance h1 is equal to or greater than ¼ of the total length hp of the piston 30 (see FIG. 2). This makes it easier to appropriately set the first partial region R2*a* to a portion of the inner wall surface 13 where pressure acts from the piston 30.

In the second embodiment, providing the above-described concave portion formation region 50 makes it possible to reduce the sliding resistance of the piston ring 35, the surface pressure acting on the inner wall surface 13 from the skirt portion 32, and to prevent waste of the lubricating oil, in a similar manner as in the first embodiment. Further, in the second embodiment, widening the first partial region R2*a* can effectively prevent an increase in the surface pressure caused by the skirt portion 32, compared to the first embodiment.

Third Embodiment

Figure 7:
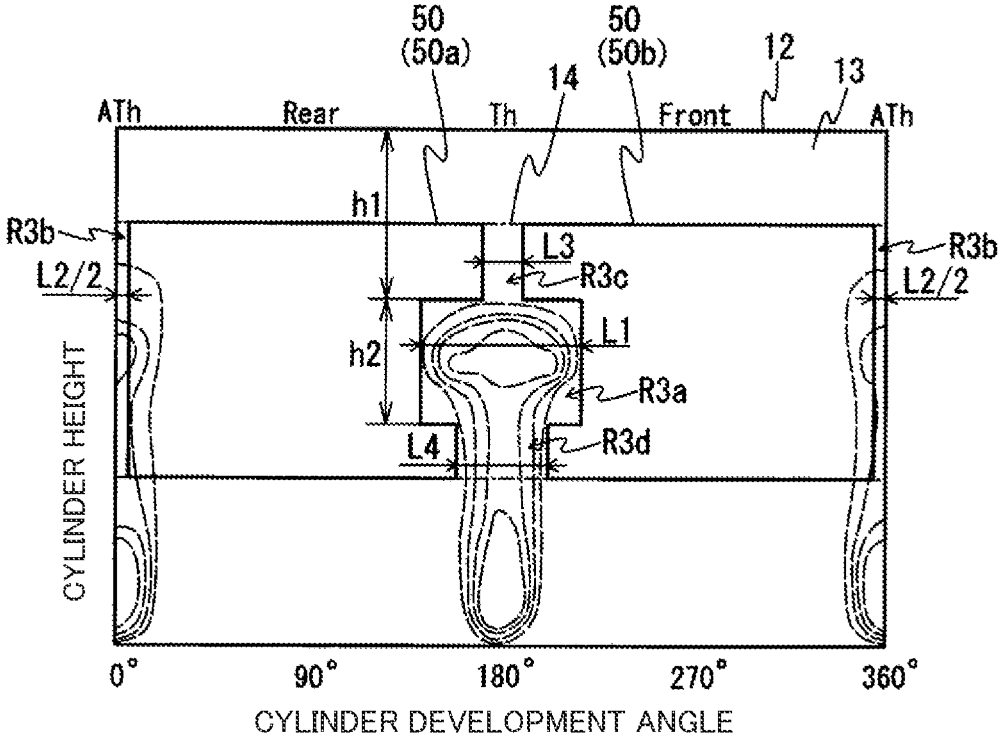
FIG. 7 is a schematic view for explaining a concave portion formation region 50 of the third embodiment.

FIG. 7 is a schematic view for explaining a concave portion formation region 50 of the third embodiment. The central region 14 of the inner wall surface 13 of the third embodiment includes a first partial region R3*a*, a second partial region R3*b*, a third partial region R3*c*, and a fourth partial region R3*d*. A region of the central region 14 excluding the four partial regions R3*a* to R3*d* is the concave portion formation region 50 in which the concave portions 52 are formed. It should be noted that, in the four partial regions R3*a* to R3*d*, a small number of concave portions may be formed, with this number being smaller than the number of concave portions formed in the concave portion formation region 50.

The first partial region R3*a* of the third embodiment differs from the first partial region R1*a* of the first embodiment, which extends across the entire region in the axial direction of the central region 14, in that the first partial region R3*a* is a region of the center in the axial direction of the central region 14. The first partial region R3*a* is a region where the pressure acting on the inner wall surface 13 from the piston 30 is largest. The first partial region R3*a* is quadrilateral (specifically, rectangular) here, but the embodiment is not limited thereto, and may be circular, for example.

The second partial region R3*b* of the third embodiment is the same region as the second partial region R2*b* of the second embodiment. The second partial region R3*b* is a region extending across the entire region in the axial direction of the central region 14. The second predetermined width L2 of the second partial region R3*b* is the same size as the second predetermined width L2 of the second partial region R2*b* of the second embodiment.

The third partial region R3*c* of the third embodiment is the same region as the third partial region R2*c* of the second embodiment. The third partial region R3*c* is located on the top dead center side of the central region 14, and is connected to the first partial region R3*a*.

The fourth partial region R3*d* is a rectangular region located on the bottom dead center side of the central region 14. The fourth partial region R3*d* is connected to the first partial region R3*a* along the axial direction. The fourth partial region R3*d* is a region avoiding a portion where pressure acts on the inner wall surface 13 from the piston 30.

A fourth predetermined width L4 along the circumferential direction of the fourth partial region R3*d* is smaller than the first predetermined width L1 of the first partial region R3*a*. This can widen a region where the concave portions 52 are to be formed, compared to such a region in the second embodiment, while avoiding the portion where the pressure acts on the inner wall surface 13 from the piston 30. It should be noted that the fourth predetermined width L4 of the fourth partial region R3*d* is larger than the third predetermined width L3 of the third partial region R3*c*.

It should be noted that the position of a boundary between the first partial region R3*a* and the third partial region R3*c* is a position apart from the upper end of the cylinder 12 by a distance h1 in the axial direction. The distance h1 is equal to or greater than ¼ of the total length hp of the piston 30 (see FIG. 2). The length h2 of the first partial region R3*a* in the axial direction is equal to or less than ⅔ of one stroke (see FIG. 2) at the time when the piston 30 reciprocates between the top dead center and the bottom dead center. This makes it easier to appropriately set the first partial region R3*a* to a portion where large pressure acts on the inner wall surface 13 from the piston 30.

In the third embodiment, providing the above-described concave portion formation region 50 makes it possible to reduce the sliding resistance of the piston ring 35 and the surface pressure acting on the inner wall surface 13 from the skirt portion 32, and to prevent waste of the lubricating oil, in a similar manner as in the first embodiment. Further, in the third embodiment, it is possible to effectively prevent an increase in the surface pressure caused by the skirt portion 32 by providing the first partial region R3*a*, the third partial region R3*c*, and the fourth partial region R3*d* respectively corresponding to regions where the surface pressure from the skirt portion 32 is large.

Fourth Embodiment

Figure 8:
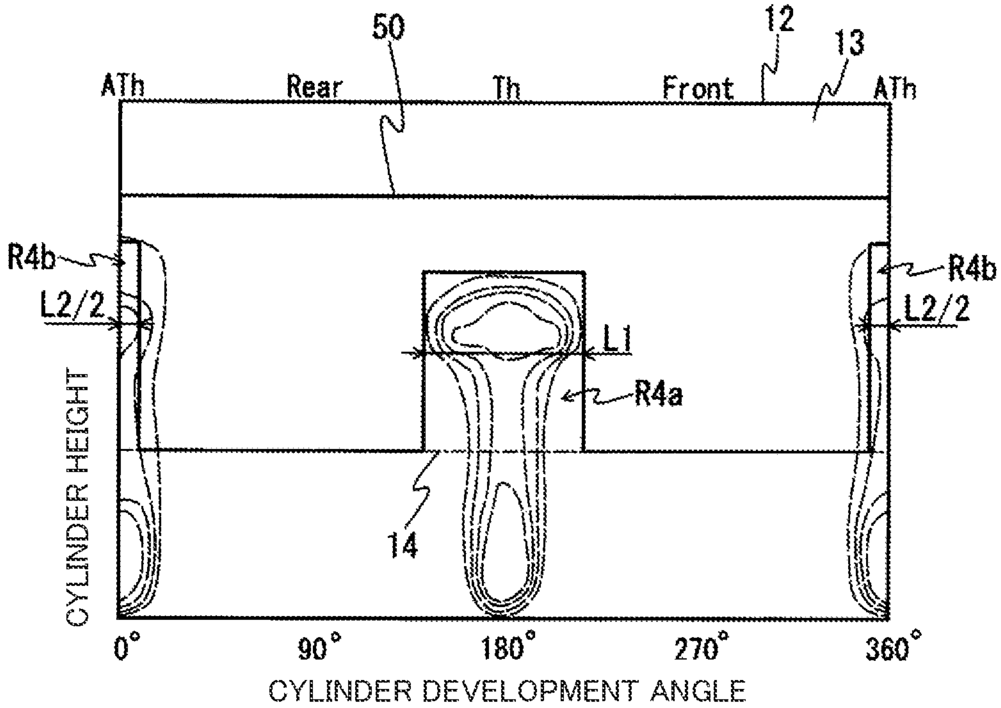
FIG. 8 is a schematic view for explaining a concave portion formation region 50 of the fourth embodiment.

FIG. 8 is a schematic view for explaining a concave portion formation region 50 of the fourth embodiment. The central region 14 of the inner wall surface 13 of the fourth embodiment includes a first partial region R4*a* and a second partial region R4*b*. A part of the central region 14 excluding the two partial regions R4*a* and R4*b* is the concave portion formation region 50 in which the concave portions 52 are formed.

The first partial region R4*a* of the fourth embodiment differs from the first partial region R1*a* of the first embodiment, which extends across the entire region in the axial direction of the central region 14, in that the first partial region R4*a* is a region extending from the center to the bottom dead center side in the axial direction of the central region 14. Here, the first partial region R4*a* of the fourth embodiment is the same region as the first partial region R2*a* of the second embodiment.

The third partial region R2*c* connected to the first partial region R2*a* on the top dead center side is provided in the second embodiment, but the third partial region R2*c* is not provided in the fourth embodiment. This is because pressure from the piston 30 is small in a region closer to the top dead center, compared to that in the first partial region R1*a* in the central region 14, and thus providing the concave portions 52 in this region barely affects an increase in the surface pressure.

The second partial region R4*b* of the fourth embodiment differs from the second partial region R1*b* of the first embodiment, which extends across the entire region in the axial direction of the central region 14, in that the second partial region R4*b* is a region extending from the center to the bottom dead center side in the axial direction of the central region 14. The second predetermined width L2 of the second partial region R4*b* is the same as the second predetermined width L2 of the second partial region R1*b*. Since the first partial region R4*a* and the second partial region R4*b* are regions such as described above, the entire circumference in the circumferential direction is the concave portion formation region 50 in the upper portion of the central region 14.

In the fourth embodiment, providing the above-described concave portion formation region 50 makes it possible to reduce the sliding resistance of the piston ring 35 and the surface pressure acting on the inner wall surface 13 from the skirt portion 32, and to prevent waste of the lubricating oil, in a similar manner as in the first embodiment. Further, since the internal combustion engine is assumed to be used in a case of consuming less lubricating oil in the fourth embodiment, the third partial region R2*c* is not provided, and the region of the second partial region R4*b* is narrowed. This makes it possible to further reduce the sliding resistance of the piston ring 35.

Fifth Embodiment

Figure 9:
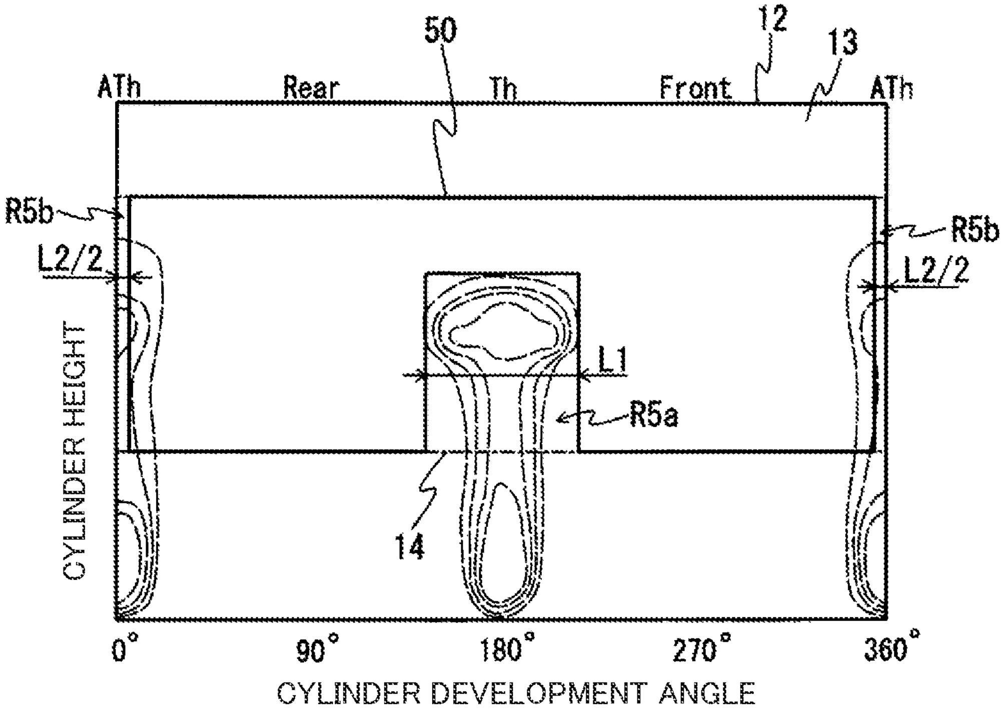
FIG. 9 is a schematic view for explaining a concave portion formation region 50 of the fifth embodiment.

FIG. 9 is a schematic view for explaining a concave portion formation region 50 of the fifth embodiment. The central region 14 of the inner wall surface 13 of the fifth embodiment includes a first partial region R5*a* and a second partial region R5*b*. A region of the central region 14 excluding the two partial regions R5*a* and R5*b* is the concave portion formation region 50 in which the concave portions 52 are formed.

The first partial region R5*a* of the fifth embodiment is a region extending from the center to the end on the bottom dead center side in the axial direction of the central region 14, and is the same region as the first partial region R4*a* of the fourth embodiment. In the fifth embodiment, the third partial region R2*c* is not provided, in a similar manner as in the fourth embodiment.

The second partial region R5*b* of the fifth embodiment is a region extending across the entire region in the axial direction of the central region 14, and is the same region as the second partial region R1*b* of the first embodiment.

In the fifth embodiment, providing the above-described concave portion formation region 50 makes it possible to reduce the sliding resistance of the piston ring 35 and the surface pressure acting on the inner wall surface 13 from the skirt portion 32, and to prevent waste of the lubricating oil in a similar manner as in the first embodiment. Further, in the fifth embodiment, since the surface pressure on the anti-thrust side is widely distributed toward the top dead center side, providing the second partial region 5*b* can effectively prevent an increase in the surface pressure caused by the formation of the concave portions 52.

<Effects of the Present Embodiment>

In the internal combustion engine 1 of the above-described embodiments, the number of concave portions formed in the first partial region (R1*a*, etc.) and the second partial region (R1*b*, etc.) in the central region 14 of the inner wall surface 13 of the cylinder 12 is less than the number of concave portions formed in the concave portion formation region 50. Specifically, the concave portions 52 are formed at predetermined intervals in the concave portion formation region 50 excluding the first partial region R1*a* and the second partial region R1*b*.

Due to this, since the first partial region R1*a* and the second partial region R1*b* are provided such that they cover regions where the surface pressure from the skirt portion 32 increases, it is possible to prevent the skirt portion 32 from coming into contact with the concave portion 52 at a portion where the surface pressure increases. Thus, it is possible to prevent an increase in the surface pressure caused by the contact of the skirt portion 32 with the concave portion 52.

Further, providing the second partial region R1*b* in addition to the first partial region R1*a* narrows the concave portion formation region 50, thereby reducing the number of concave portions 52. This makes it possible to reduce the amount of lubricating oil moving from the concave portions 52 to the combustion chamber side, thus preventing waste of the lubricating oil.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An internal combustion engine comprising:

a piston that includes a skirt portion and reciprocates between a top dead center and a bottom dead center;

a cylinder in which the piston slides over an inner wall surface, the inner wall surface including a thrust region against which the skirt portion is pressed when the piston moves downward, on the inner wall surface, and an anti-thrust region that is opposite to the thrust region on the inner wall surface; and a plurality of concave portions formed in a belt-like central region including a central portion in an axial direction of the cylinder and extending along a circumferential direction on the inner wall surface, wherein in the central region, the number of concave portions formed in a first partial region having a first predetermined width along the circumferential direction of the thrust region and the number of concave portions formed in a second partial region having a second predetermined width that is smaller than the first predetermined width along the circumferential direction of the anti-thrust region is smaller than number of concave portions formed in other regions in the central region.

2. The internal combustion engine according to claim 1, wherein the first predetermined width is equal to or less than a width of the skirt portion in the circumferential direction.

3. The internal combustion engine according to claim 1, wherein the first partial region and the second partial region are regions extending across an entire region in the axial direction of the central region.

4. The internal combustion engine according to claim 1, wherein the first partial region is a region of a center in the axial direction within the central region, the central region includes a third partial region on a top dead center side, which is connected to the first partial region along the axial direction, a third predetermined width of the third partial region along the circumferential direction is smaller than the first predetermined width, and the number of concave portions formed in the first partial region, the second partial region, and the third partial region is smaller than the number of concave portions formed in other regions in the central region.

5. The internal combustion engine according to claim 4, wherein a distance of a boundary position between the first partial region and the third partial region from an upper end of the cylinder in the axial direction is equal to or greater than ¼ of a length of the piston in the axial direction.

6. The internal combustion engine according to claim 4, wherein the central region includes a fourth partial region on a bottom dead center side, which is connected to the first partial region along the axial direction, a fourth predetermined width of the fourth partial region along the circumferential direction is smaller than the first predetermined width and larger than the third predetermined width, and the number of concave portions formed in the first partial region, the second partial region, the third partial region, and the fourth partial region is smaller than the number of concave portions formed in other regions in the central region.

7. The internal combustion engine according to claim 6, wherein a length of the first partial region in the axial direction is equal to or less than ⅔ of a stroke at a time when the piston reciprocates between the top dead center and the bottom dead center.

8. The internal combustion engine according to claim 1, wherein the first partial region and the second partial region are regions extending from a center to an end on the bottom dead center side in the axial direction of the central region.

9. The internal combustion engine according to claim 1, wherein the first partial region is a region extending from a center to an end on the bottom dead center side in the axial direction of the central region, and the second partial region is a region extending across an entire region in the axial direction of the central region.

10. The internal combustion engine according to claim 1, wherein the central region is a region located below a ring groove that is provided on an outer peripheral surface of the piston positioned at the top dead center in a height direction and located above the ring groove of the piston positioned at the bottom dead center in the height direction.

11. The internal combustion engine according to claim 1, wherein the concave portion is not formed in the first partial region and the second partial region.

* * * * *